INVENTOR.
JAMES J GRIFFIN

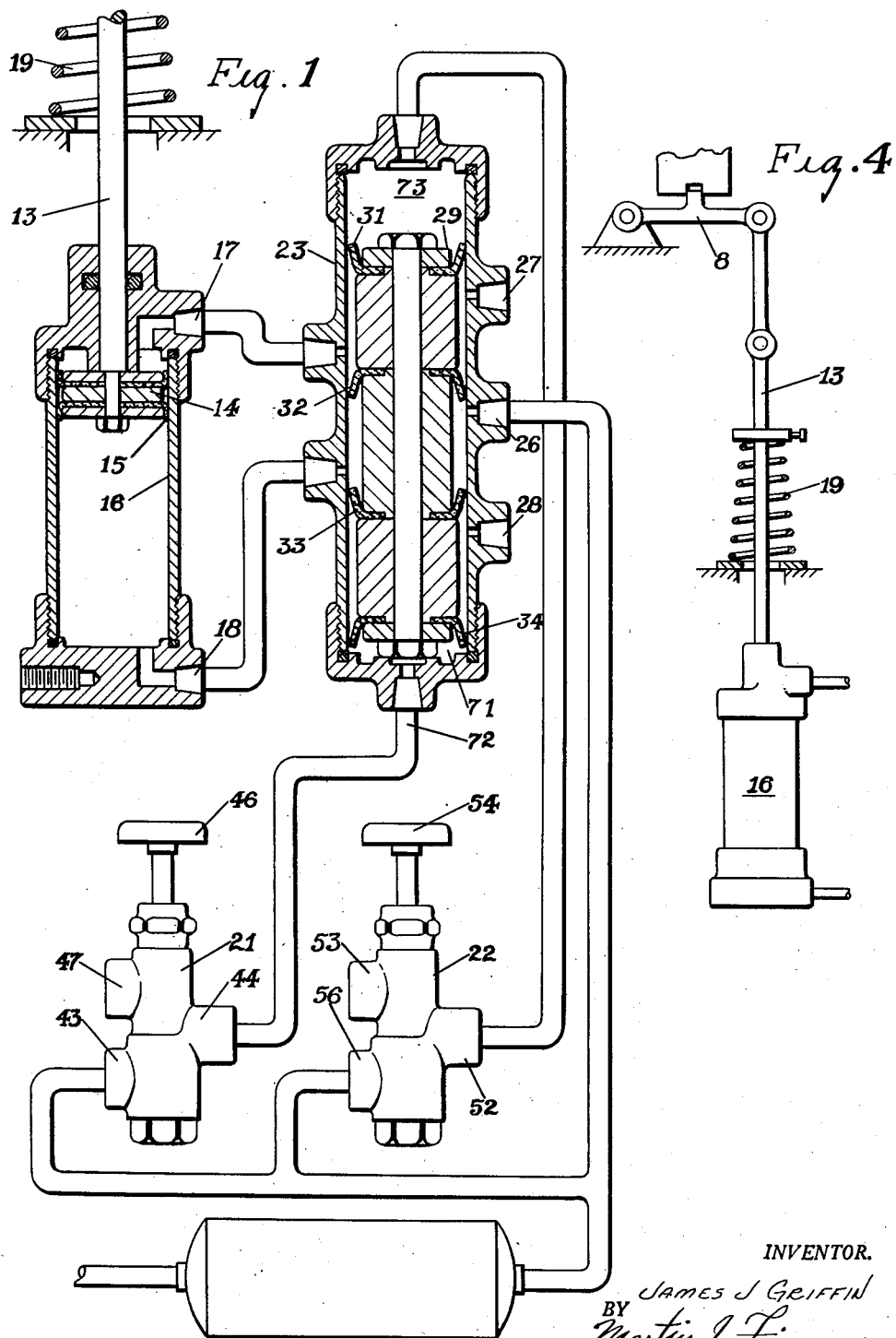

Patented June 3, 1952

2,598,907

UNITED STATES PATENT OFFICE 2,598,907

TWO-HAND FLUID PRESSURE CONTROL OF POWER MACHINERY

James J. Griffin, Owosso, Mich., assignor, by mesne assignments, to National Pneumatic Co., Inc., Boston, Mass., a corporation of Delaware Application March 3, 1949, Serial No. 79,399

3 Claims. (Cl. 121—38)

This invention relates to power machinery, and particularly to machinery for performing an operation, such as punching, stamping, or the like, on a metallic article or piece of stock adapted to be positioned manually.

Operators of power presses and analogous power machinery frequently suffer injuries to hands and arms because of the failure or shortcomings of safety devices intended to protect the operator by making it difficult to produce an operating stroke of the machine when the hands of the operator are dangerously close to the point of application of the work performing tool.

A common type of protective device, applied to power presses, for example, is a safety clutch for interrupting the drive, the clutch being controlled by a compressed air-operated "clutch trip" which, in theory at least, is operable to cause clutch engagement only when the hands of the operator are well away from danger. Such a clutch trip is illustrated in the U. S. patent to Williams, Patent Number 2,268,733, granted January 6, 1942; a single "puff" or surge of air being admitted to a cylinder containing a piston adapted to operate the clutch tripping mechanism. Associated with the clutch tripping cylinder is a series of valves and inter-connections, including differentially and delicately adjusted pressure-responsive controls, to which complicated array certain improvement patents, notably the patent to Chochol, Patent No. 2,423,482, add other critical factors such as cam elements movable with certain portions of the power press machinery to control one or more phases of the compressed air operation. All these complications are, in themselves, sources of additional hazards, some of which are pointed out specifically in the Chochol patent above identified. Overlying all such specific objectives is the fact that the very cumbersomeness of the resulting control apparatus renders it wholly unsuitable for many types of power press installations.

An object of the present invention is to provide operating means of novel concept and construction for producing motion of the clutch trip or other safety element in first one and then the other direction of its movement. In this connection a feature of the invention is the use of fluid under pressure to move the clutch trip in each of its two directions of movement, in contradistinction to the mode of operation in the Williams and Chochol patents, wherein there is fluid pressure operation in one direction only.

A third object of the invention is to provide novel means, operatively associated with the clutch control cylinder, requiring simultaneous use of two hands, and the subsequent release of two valves concurrently, by the concurrent withdrawal of both hands, to complete a single (nonrepeating) cycle of the machine being controlled.

A fourth object of the invention is to provide novel means for precluding any possibility of improper resort to unbalanced characteristics of the clutch control forces, such as differential areas on piston faces or uni-directional spring pressures; such unbalanced forces being so controlled by this invention that they become incapable of providing a basis for incorrect operation of the machine.

A fifth object of the invention is to provide a novel combination of manual and automatic valves for the application of power to the safety control unit of a power press or analogous machine.

Other objects and features of this invention will become apparent upon examination of the following further description to be read with reference to the accompanying drawings wherein:

Fig. 1 is a schematic representation of a fluid pressure system embodying the present invention;

Fig. 4 shows one manner of applying the system to the control of a clutch trip forming part of a power press drive.

Figure 3:
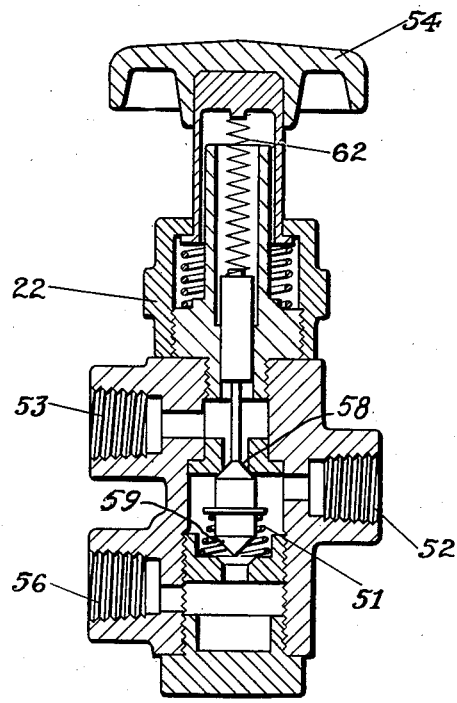
Figs. 2 and 3 are longitudinal sectional views of the pressure and exhaust valves, respectively.
Figure 2:
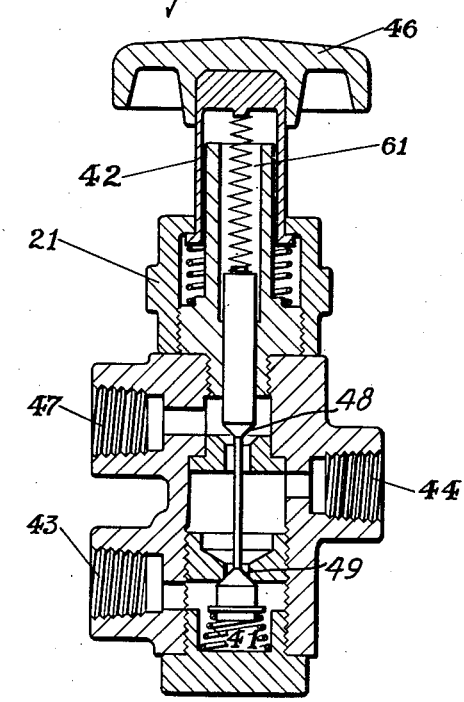

In Fig. 4 a clutch tripping lever 8 is adapted to control the establishment of a driving relationship between the drive shaft and the reciprocable head (not shown) of a power press having dies adapted to co-operate in performing an operation upon a work-piece placed therebetween by the operator of the machine; one such die being carried by the said reciprocable head. Lever 8 is mounted to move with the rod 13 of a piston assembly shown best in Fig. 1, the said assembly including a built-up piston 14 with oppositely turned sealing cups 15 slidable along the surface of the cylinder 16 whose end sections are provided with ports 17, 18 for alternate admission and exhaust of operating fluid.

While the piston rod 13 is constantly urged upward by a coiled spring 19 (to insure movement of the clutch tripping lever 8 to the clutch disengaging position in the event of failure of the compressed air or other fluid supply) the normal operation of the piston 14 is by positive fluid pressure, applied first to the upper face and subsequently to the lower face of the piston by the novel control means now to be described.

Manually operable valves 21 and 22 are mounted in separate positions requiring use of two hands simultaneously for operation thereof, and pilot valve 23 (Fig. 1) is connected between said valves 21, 22, on the one hand, and ports 17, 18 of cylinder 16, on the other, as indicated schematically in Fig. 1. The pilot valve 23 has a central supply port 26 flanked on either side by exhaust ports 27, 28. The shiftable assembly 29 of the valve 23 is so proportioned, in respect to the locations of the sealing cups 31, 32, 33, 34 thereon, that it is impossible to apply fluid pressure to both ends of cylinder 16 simultaneously, hence one end of the cylinder will always be connected to one of the exhaust ports 27, 28 whenever the other end is receiving supply fluid from port 26. The importance of this feature will appear more clearly hereinafter.

Reverting to the manual valves, valve 21 is of the "pressure" type, while valve 22 is of the "exhaust" type; meaning that the spring 41 of the former, by normally urging valve stem 42 to its upper position, closes the path of communication between pressure fluid supply port 43 and the port 44, so that manual pressure on the button 46 is required to establish such communication. Conversely, spring 51 of valve 22 normally closes the path of communication between valve port 52 and exhaust port 53, so that manual pressure on button 54 is required to open this exhaust path. Each valve, of course, has a third port, the exhaust port 47 of valve 21, and supply port 56 of valve 22. Correspondingly, each valve core has two working faces, one of which leaves its seat when the other is seated, and vice-versa; the valve faces being indicated by numerals 48 and 49 in valve 21, and by numerals 58 and 59 in valve 22. Springs 61 and 62 yieldingly transmit the operating force to the movable valve cores of the valves 21 and 22, respectively, when buttons 46 and 54 are depressed.

The two valve cores will, in response to simultaneous depression of the buttons 46 and 54, cause pressure fluid to be supplied to the lower chamber 71 of pilot valve 23 by way of conduit 72, and simultaneously to be exhausted from the upper chamber 73. This will promptly move the pilot valve piston its full stroke to the top which in turn will operate the double acting engine on the press. Simultaneously, releasing both hand valves will reverse the valve piston movement and in turn return the engine, on the press, to its normal position.

Should the left hand pressure type hand valve be held or tied down continuously, this will put pressure on the lower end of the pilot valve and by depressing the right hand valve air pressure will be exhausted and the valve piston will move to the right and operate the engine on the press. Releasing the right hand valve (left hand valve still held down) will put pressure back on the upper end of the pilot valve but there is still pressure on the lower side of the pilot valve piston, so the valve piston will remain at its extreme upper position and the engine on the press will not be operated.

If the right hand valve is held or tied down, the pilot valve piston will not move, as there is then no pressure on either side of the valve piston. Then if the left hand (pressure type) hand valve is depressed air is admitted to the lower end of the pilot valve piston, forcing the valve piston upwardly and operating the engine on the press. Release of the left hand valve exhausts the lower end of the pilot valve, but the piston remains stationary and engine does not operate. Consequently if one hand valve is held or tied down, the punch press can only be operated for one cycle by pushing down on the other hand valve and releasing same, and the only way the press can be operated normally is to use the two valves simultaneously, requiring two hand operations by the operator.

What I claim is:

1. Means for operating the safety control of a power machine comprising a pressure fluid receiving cylinder having a piston therein, operating connections from said piston to said safety control, a source of fluid pressure, a pair of manually controlled three-way valves interposed in parallel relationship between said source and said fluid receiving cylinder, each of said valves including an exhaust port for venting to the atmosphere the fluid delivered to said valves from said fluid-receiving cylinder in one position of each of said valves, said exhaust vent being closed off in the opposite position of each of said three-way valves, which opposite position is the position in which communication is established between said source and said fluid-receiving cylinder, a fluid pressure-operated reversing valve also interposed between said source and said cylinder, means responsive to pressure exerted manually and simultaneously on said pair of three-way valves to cause a shifting of said reversing valve and thereby cause pressure fluid to be directed against one face of said piston to shift said safety control to the position in which said machine commences a single cycle of operation, said three-way valves operating automatically upon the release of said manual pressure to cause a shifting of said reversing valve to a new position wherein pressure fluid is withdrawn from said one face and applied to the opposite face of said piston, to return said safety control to its initial position and thereby prevent a second operation of the machine prior to re-exertion of manual pressure on said pair of three-way valves.

2. Mechanism as defined in claim 1, wherein said pair of manually operated valves are so spaced as to require the use of two hands for operation thereof.

3. Mechanism as defined in claim 2, wherein said pair of manually operated valves include resilient elements for shifting said valves to positions producing a reversal of fluid flow in each of said control conduits, upon removal of the manually applied pressure.

JAMES J. GRIFFIN.

REFERENCES CITED

The following references are of record in the file of this patent:

UNITED STATES PATENTS

| Number | Name | Date |
| --- | --- | --- |
| 1,776,679 | Carroll | Sept. 23, 1930 |
| 1,829,184 | Daly | Oct 27, 1931 |
| 1,946,348 | Bath | Feb. 6, 1934 |
| 2,013,102 | Ledbetter | Sept. 3, 1935 |
| 2,019,766 | Peterson | Nov. 5, 1935 |
| 2,105,253 | Malcott | Jan. 11, 1938 |
| 2,132,811 | Tomkins | Oct. 11, 1938 |
| 2,273,171 | Bennet | Feb. 17, 1942 |
| 2,346,829 | Davis | Apr. 18, 1944 |
| 2,423,482 | Chochol | July 8, 1947 |